United States Patent
Kwon et al.

(10) Patent No.: US 10,435,068 B2
(45) Date of Patent: Oct. 8, 2019

(54) SUSPENSION SYSTEM FOR VEHICLE

(71) Applicants: Hyundai Motor Company, Seoul (KR); Kia Motors Corporation, Seoul (KR); Seoul National University R&DB Foundation, Seoul (KR)

(72) Inventors: Seungmin Kwon, Seoul (KR); Yong Sub Yi, Suwon-si (KR); Seung Hoon Woo, Seongnam-si (KR); Yoon Young Kim, Seoul (KR); Suh In Kim, Seoul (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 100 days.

(21) Appl. No.: 15/673,670

(22) Filed: Aug. 10, 2017

(65) Prior Publication Data

US 2018/0162443 A1    Jun. 14, 2018

(30) Foreign Application Priority Data

Dec. 14, 2016  (KR) .......................... 10-2016-0170811

(51) Int. Cl.
*B62D 7/20* (2006.01)
*B62D 7/18* (2006.01)
*B60G 3/20* (2006.01)

(52) U.S. Cl.
CPC ................. *B62D 7/20* (2013.01); *B60G 3/20* (2013.01); *B62D 7/18* (2013.01); *B60G 2200/144* (2013.01); *B60G 2200/18* (2013.01); *B60G 2204/421* (2013.01)

(58) Field of Classification Search
USPC ....................................................... 280/93.51
See application file for complete search history.

(56) References Cited

U.S. PATENT DOCUMENTS

| | | | |
|---|---|---|---|
| 5,496,055 A * | 3/1996 | Shibahata | B60G 3/265 267/188 |
| 8,205,900 B1 * | 6/2012 | Moravy | B60G 3/20 280/124.138 |
| 2016/0083004 A1 * | 3/2016 | Uchihara | B60G 3/20 280/780 |

FOREIGN PATENT DOCUMENTS

WO    WO-2014181561 A1 *  11/2014  ............. B60G 3/20

* cited by examiner

*Primary Examiner* — Joseph M Rocca
*Assistant Examiner* — Hilary L Johns
(74) *Attorney, Agent, or Firm* — Morgan, Lewis & Bockius LLP

(57) ABSTRACT

A suspension system for a vehicle may include a knuckle rotatably supporting a wheel and a plurality of arms connecting the knuckle with a vehicle body wherein an arm among the plurality of arms may be a virtual link formed by a virtual link module and a point at which the virtual link applies a constraint force to the knuckle may be formed at a virtual space.

15 Claims, 4 Drawing Sheets

SUSPENSION SYSTEM FOR VEHICLE

CROSS-REFERENCE(S) TO RELATED APPLICATIONS

The present application claims priority to Korean Patent Application No. 10-2016-0170811 filed on Dec. 14, 2016, the entire contents of which are incorporated herein for all purposes by this reference.

BACKGROUND OF THE INVENTION

Field of the Invention

The present invention relates to a suspension system for a vehicle. More particularly, the present invention relates to a suspension system for a vehicle that can substitute for a conventional arm and function as a longer arm than the conventional arm using a virtual link module acting as a virtual arm.

Description of Related Art

A suspension system is provided in a vehicle between an axle and a vehicle body to enhance ride comfort and driving stability by reducing vibration or impact energy transmitted while driving the vehicle.

The suspension system must meet essential conditions wherein irregular input from a road while driving the vehicle is effectively absorbed to increase ride comfort, shake of a vehicle body due to handling of a driver or curve of a road is suitably controlled to increase driving convenience, and vertical load on a tire tread is maintained in a proper level when a vehicle runs on an irregular road to secure handling performance and stability in turning, braking, or driving.

A wheel position by geometry is a very important factor for meeting the above conditions. The wheel position is greatly changed according to a relative movement against a vehicle body, and the entire performance of the vehicle may be dependent of the changed wheel position.

Recently, a suspension system of a multi-link type has been developed and applied to a passenger vehicle. According to the suspension system of the multi-link type, impact and vibration input from the road and vibration of the vehicle body may be efficiently absorbed through ideal kinematics using more than three links.

The suspension system of the multi-link type can improve performance but has limits to achieve an ideal wheel position. Since a suspension system of the multi-link type uses a plurality of links, thereby the number of components and a volume increases, manufacturing cost also increases, and available space thereafter is reduced.

In addition, since a volume occupied by the suspension system in the vehicle is very large, it is difficult to dispose a battery module in a hybrid electric vehicle or dispose a hydrogen tank in a hydrogen vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a suspension system for a vehicle having advantages of achieving a virtual link which substitutes for a conventional arm in the suspension system and functions as a longer arm than the conventional arm.

Various aspects of the present invention are directed to providing a suspension system for a vehicle having advantages of efficiently using a remaining space formed when a small virtual link module substitutes for the conventional arm in the suspension system.

A suspension system for a vehicle according to an exemplary embodiment of the present invention may include a knuckle rotatably supporting a wheel and a plurality of arms connecting the knuckle with a vehicle body.

One arm among the plurality of arms may be a virtual link formed by a virtual link module and a point in which the virtual link applies a constraint force to the knuckle may be formed at a virtual space.

The virtual link module may include: an upper virtual arm including two arms extending from a virtual joint to form a triangle; and a lower virtual arm including two arms extending from a virtual joint to form a triangle different from the triangle formed by the upper virtual arm, wherein end portions of the two arms of the upper virtual arm are respectively connected to the knuckle, and end portions of the two arms of the lower virtual arm are respectively connected to the vehicle body.

The end portions of the two arms of the upper virtual arm may be respectively formed of an internal joint and an external joint, and the end portions of the two arms of the lower virtual arm may be respectively formed of an internal joint and an external joint.

Horizontal rubber bushings may be respectively used for the internal joint and the external joint of the upper virtual arm, and horizontal rubber bushings may be respectively used for the internal joint and the external joint of the lower virtual arm.

A ball joint may be used for the virtual joint to enable the relative rotation of the upper virtual arm and the lower virtual arm.

The point at which the virtual link applies the constraint force to the knuckle may be an intersection point formed by intersecting an intersection line wherein an extending surface of the triangle formed by the upper virtual arm intersects with an extending surface of the triangle formed by the lower virtual arm with an extending line connecting the end portions of the two arms of the lower virtual arm.

The virtual link may be formed by the intersection line between the intersection point and the virtual joint.

The internal joint of the upper virtual arm may be disposed lower than the external joint of the upper virtual arm, and the internal joint of the lower virtual arm may be disposed higher than the external joint of the lower virtual arm.

A suspension system for a vehicle according to another exemplary embodiment of the present invention may include a knuckle rotatably supporting a wheel and a plurality of arms connecting the knuckle with a vehicle body, wherein an arm among the plurality of arms of arms is a virtual link formed by a virtual link module, and the virtual link module includes an upper virtual arm and a lower virtual arm respectively having two arms extending from a virtual joint to cause a point at which the virtual link applies a constraint force to the knuckle to be formed at a virtual space.

The two arms of the upper virtual arm may extend from the virtual joint to form a triangle, and end portions of the two arms of the upper virtual arm may be respectively connected to the knuckle. The two arms of the lower virtual arm may extend from the virtual joint to form a triangle different from the triangle formed by the upper virtual arm, and end portions of the two arms of the lower virtual arm may be respectively connected to the vehicle body.

The end portions of the two arms of the upper virtual arm may be respectively formed of an internal joint and an external joint, and the end portions of the two arms of the lower virtual arm may be respectively formed of an internal joint and an external joint.

Horizontal rubber bushings may be respectively used for the internal joint and the external joint of the upper virtual arm, and horizontal rubber bushings may be respectively used for the internal joint and the external joint of the lower virtual arm.

A ball joint may be used for the virtual joint to enable the relative rotation of the upper virtual arm and the lower virtual arm.

The point at which the virtual link applies the constraint force to the knuckle may be an intersection point formed by intersecting an intersection line wherein an extending surface of the triangle formed by the upper virtual arm intersects with an extending surface of the triangle formed by the lower virtual arm with an extending line connecting the end portions of the two arms of the lower virtual arm.

The virtual link may be formed by the intersection line between the intersection point and the virtual joint.

The internal joint of the upper virtual arm may be disposed lower than the external joint of the upper virtual arm, and the internal joint of the lower virtual arm may be disposed higher than the external joint of the lower virtual arm.

A suspension system according to an exemplary embodiment of the present invention includes a small virtual link module substituting for a conventional arm of the suspension system. Since the small virtual link module functions as a longer arm than the conventional arm in a smaller space, driving performance may be improved.

In addition, since the small virtual link module substitutes for the conventional arm, a remaining space is enlarged. Therefore, a battery of a hybrid electric vehicle or a hydrogen tank of a hydrogen vehicle may be efficiently disposed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
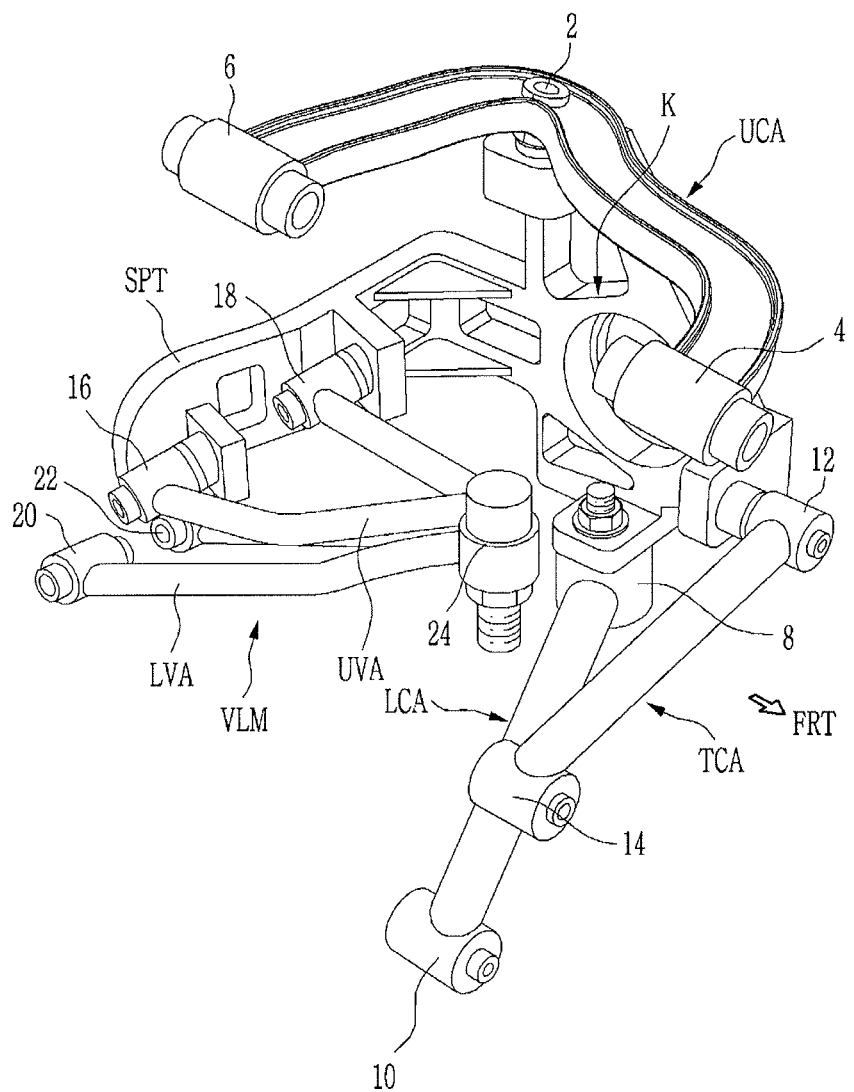
FIG. 1 is a perspective view of a suspension system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

To describe the present invention explicitly, a part which is not related to the description is omitted.

FIG. 1 is a perspective view of a suspension system according to an exemplary embodiment of the present invention.

Referring to FIG. 1, a suspension system according to an exemplary embodiment of the present invention includes a knuckle K, an upper control arm UCA, a front lower control arm LCA, a toe control arm TCA, and a virtual link module VLM. In addition, the suspension system further includes shock-absorbing device including a coil spring and a shock absorber.

Meanwhile, the virtual link module VLM substitutes for a rear lower control arm in the exemplary embodiment of the present invention, but is not limited thereto. The virtual link module VLM according to the exemplary embodiment of the present invention can substitute for at least one of a front lower control arm LCA, an upper control arm UCA, and a toe control arm TCA applied to a suspension system of an independent type and a trailing arm applied to a suspension system of another type.

The knuckle K rotatably supports a wheel.

The upper control arm UCA includes a or two arms. In the exemplary embodiment of the present invention the upper control arm UCA is formed by pressing a steel plate to have a rib.

That is, the upper control arm UCA is disposed in a width direction of a vehicle, a middle portion of the upper control arm UCA is connected to an upper end portion of the knuckle K through an external joint 2, and both free end portions of the upper control arm UCA are connected to a vehicle body respectively through a front internal connecting portion 4 and a rear internal connecting portion 6.

The front lower control arm LCA is disposed in the width direction of the vehicle, an external end portion of the front lower control arm LCA is connected to a lower portion of the knuckle K through an external joint 8, and an internal end portion of the front lower control arm LCA is connected to the vehicle body through an internal joint 10.

It is exemplified in the drawings that ball joints are used for the external joints 2 and 8, but the external joints 2 and 8 are not limited to the ball joints. For instance, horizontal rubber bushings may be used for the external joints 2 and 8. Horizontal rubber bushings may be used for the internal connecting portions 4 and 6 and the internal joints, but the internal connecting portions 4 and 6 and the internal joints are not limited to the horizontal rubber bushings.

The toe control arm TCA is disposed in the width direction of the vehicle, an external end portion of the toe control arm TCA is connected to a front center portion of the knuckle K through an external joint 12, and an internal end portion of the toe control arm TCA is connected to the vehicle body through an internal joint 14.

Horizontal rubber bushings may be used for the external joint 12 and the internal joint 14, but the external joint 12 and the internal joint 14 are not limited to the horizontal rubber bushings.

Figure 2:
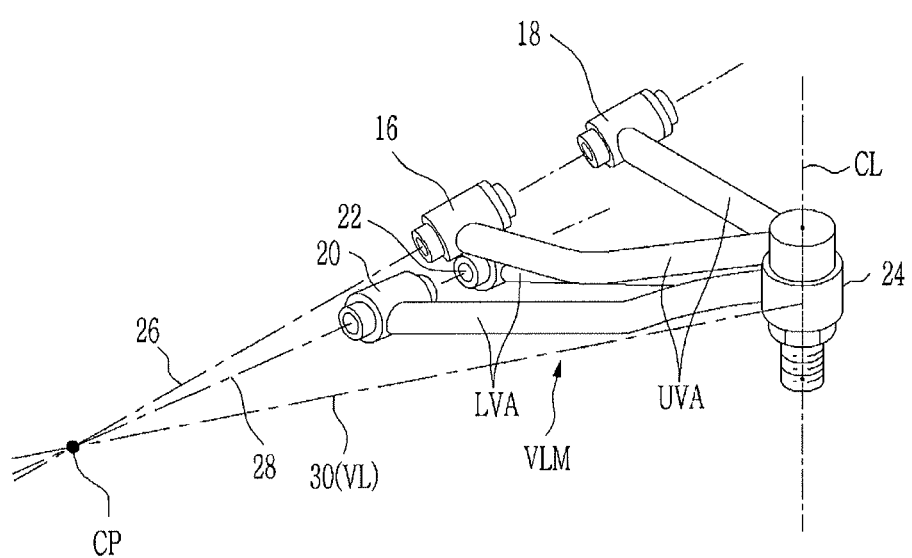
FIG. 2 is a perspective view of a virtual link module applied to a suspension system according to an exemplary embodiment of the present invention.
Figure 3:
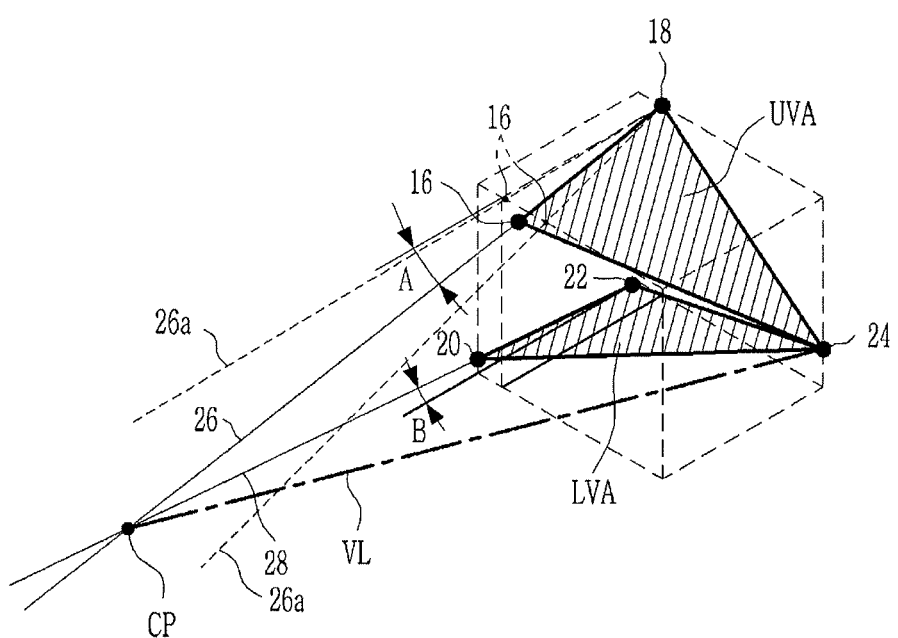
FIG. 3 is a schematic diagram for explaining an effective length of a virtual link set by a virtual link module applied to a suspension system according to an exemplary embodiment of the present invention.

FIG. 2 is a perspective view of a virtual link module applied to a suspension system according to an exemplary embodiment of the present invention, and FIG. 3 is a schematic diagram for explaining an effective length of a virtual link set by a virtual link module applied to a suspension system according to an exemplary embodiment of the present invention.

Referring to FIG. 2 and FIG. 3, the virtual link module VLM includes an upper virtual arm UVA, a lower virtual arm LVA, and a virtual joint 24. The upper virtual arm UVA has a triangular shape, and apexes of the upper virtual arm UVA are formed at connection portions. Further, the lower virtual arm LVA has a triangular shape, and apexes of the lower virtual arm LVA are formed at connection portions.

It is exemplified in the present specification that the virtual link module VLM substitutes for a rear lower control arm. Therefore, a mounting direction of the virtual link module VLM and positions of connecting portions will be described with respect to a rear lower control arm. However, when the virtual link module VLM substitutes for another arm of the suspension system, the mounting direction of the virtual link module VLM and the positions of the connecting portions may be changed.

The upper virtual arm UVA is disposed in the width direction of the vehicle and includes two arms extending from the virtual joint 24 to form a triangle. An internal joint 16 and an external joint 18 are disposed respectively at rear end portions of the two arms, and front end portions of the two arms are connected to a point.

Here, the internal joint 16 and the external joint 18 of the upper virtual arm UVA are connected to a front portion of an engaging portion SPT formed by bending a rear middle portion of the knuckle K toward the vehicle body in the width direction of the vehicle.

In addition, the lower virtual arm LVA is disposed in the width direction of the vehicle and includes two arms extending from the virtual joint 24 to form a triangle. An internal joint 20 and an external joint 22 are disposed respectively at rear end portions of the two arms, and front end portions of the two arms are connected to the a point.

Here, the internal joint 20 and the external joint 22 of the lower virtual arm LVA are connected respectively to a lower portion of the vehicle body in the width direction of the vehicle.

In addition, the front end portion of the upper virtual arm UVA and the front end portion of the lower virtual arm LVA are connected to the a point through the virtual joint 24.

That is, the upper virtual arm UVA forms the triangle including three apexes at the internal joint 16, the external joint 18, and the virtual joint 24, and the lower virtual arm LVA forms the triangle including three apexes at the internal joint 20, the external joint 22, and the virtual joint 24.

Therefore, the internal and the external joints 16 and 20 of the upper virtual arm UVA and the internal and the external joints 18 and 22 of the lower virtual arm LVA are disposed at the rear of the virtual joint 24, and the virtual joint 24 is disposed toward the front.

In addition, horizontal rubber bushings are used for the internal and the external joints 16 and 20 of the upper virtual arm UVA and the internal and the external joints 18 and 22 of the lower virtual arm LVA, and a ball joint is used for the virtual joint 24. However, the internal and the external joints 16 and 20 of the upper virtual arm UVA, the internal and the external joints 18 and 22 of the lower virtual arm LVA, and the virtual joint 24 are not limited thereto. Ball joints may be used for the internal and the external joints 16 and 20 of the upper virtual arm UVA and the internal and the external joints 18 and 22 of the lower virtual arm LVA, and a horizontal rubber bushing may be used for the virtual joint 24.

Meanwhile, the external joints 18 and 22 are disposed close to a wheel, and the internal joints 16 and 20 are disposed close to the vehicle body in the exemplary embodiment of the present invention.

The virtual link module VLM forms a virtual arm (hereinafter, it will be called a 'virtual link') wherein the virtual link applies a constraint force to the knuckle K at a virtual point according to connection of the upper virtual arm UVA, the lower virtual arm LVA, and the virtual joint 24.

Referring to FIG. 3, how an effective length of the virtual link that is a virtual lower control arm formed by the virtual link module is determined will hereinafter be described.

Referring to FIG. 3, an assumption is made that a virtual triangular cross-section formed by connecting the three joints of the upper virtual arm UVA is the upper virtual arm UVA, and a virtual triangular cross-section formed by connecting the three joints of the lower virtual arm LVA is the lower virtual arm LVA.

The triangle formed by the upper virtual arm UVA and the triangle formed by the lower virtual arm LVA are not limited to those illustrated in FIG. 3. For convenience of description, it is assumed that the upper virtual arm UVA and the lower virtual arm LVA according to the exemplary embodiment of the present invention have right-angled triangular cross-sections. In the present case, the internal joint 16 and the external joint 18 of the upper virtual arm UVA are connected to the knuckle K, and the internal joint 20 and the external joint 22 of the lower virtual arm LVA are connected to the vehicle body. In addition, it is assumed that the two sides intersecting at the external joint 18 of the upper virtual arm UVA are at right angles to each other, and the two sides intersecting at the external joint 22 of the lower virtual arm LVA are at right angles to each other.

At the present time, the virtual link VL is a virtual arm that does not actually exist, but a length of the virtual link VL can be short or long according to arrangement of the upper virtual arm UVA and the lower virtual arm LVA. In addition, when the wheel strokes according to a driving condition, the knuckle K traces a motion trajectory according to the length of the virtual link VL.

The length of the virtual link VL will be determined as follows.

A virtual extending surface formed when the triangle formed by the internal joint 16 and the external joint 18 of the upper virtual arm UVA and the virtual joint 24 moves from the external joint 18 toward the internal joint 16, and a virtual extending surface formed when the triangle formed by the internal joint 20 and the external joint 22 of the lower virtual arm LVA and the virtual joint 24 moves from the external joint 22 toward the internal joint 20 cross to each other to generate a virtual intersection line 30.

In addition, an extending line 28 connecting the internal joint 20 and the external joint 22 of the lower virtual arm LVA is formed.

At the present time, an intersection point CP at which the intersection line 30 and the extending line 28 cross to each other at a vehicle body side functions as a point at which a constraint force is applied to the knuckle K. Therefore, the virtual link VL is formed from the intersection point CP along the intersection line 30, and the length of the virtual link VL is set as a length from the intersection point CP to the virtual joint 24.

Here, for the virtual extending surface formed by the triangle of the upper virtual arm UVA and the virtual extending surface formed by the triangle of the lower virtual arm LVA to intersect with each other and form the intersection line 30, the internal joint 16 of the upper virtual arm UVA is disposed lower than the external joint 18 of the upper virtual arm UVA with respect to a horizontal line. That is, a predetermined slope angle A is formed between a line connecting the external joint 18 and the internal joint 16 and the horizontal line. In addition, the internal joint 20 of the lower virtual arm LVA is disposed higher than the external joint 22 of the lower virtual arm LVA with respect to the horizontal line. That is, a predetermined slope angle B is formed between a line connecting the external joint 22 and the internal joint 20 and the horizontal line.

At the present time, a position of the intersection point CP at which the intersection line 30 and the extending line 28 intersect with each other at the vehicle body side can be changed according to the slope angles A and B of the upper virtual arm UVA and the lower virtual arm LVA. Therefore, the slope angles A and B of the upper virtual arm UVA and the lower virtual arm LVA can be determined according to the vehicle types to which the virtual link VL is applied. In addition, a distance between the intersection point CP and the virtual joint 24 (i.e., the length of the virtual link VL) can be determined according to the slope angles A and B of the upper virtual arm UVA and the lower virtual arm LVA.

Since the virtual link VL forms a virtual connecting point with the knuckle K at the virtual joint 24 and forms a virtual connecting point with the vehicle body at the intersection point CP through the upper virtual arm UVA and the lower virtual arm LVA, the virtual link VL can function as a virtual rear lower control arm.

Figure 4:
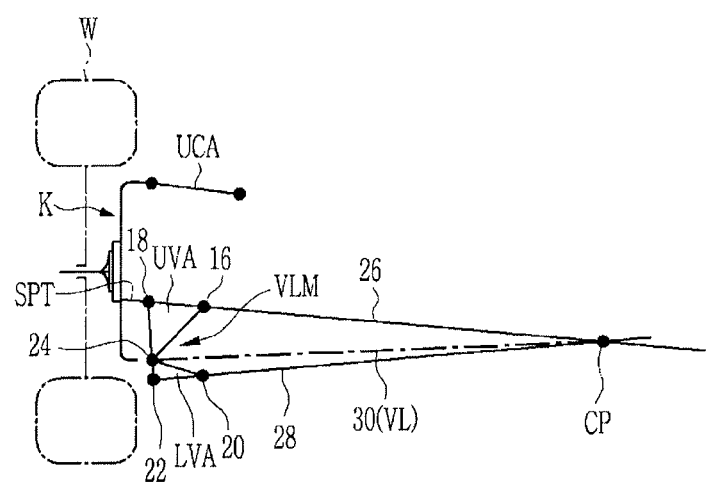
FIG. 4 is a schematic diagram for explaining effects of a suspension system according to an exemplary embodiment of the present invention.

Meanwhile, it is illustrated in FIG. 2, FIG. 3 and FIG. 4 that the extending line 26 connecting the internal joint 16 and the external joint 18 of the upper virtual arm UVA intersects with the extending line 28 connecting the internal joint 20 and the external joint 22 of the lower virtual arm LVA at the intersection point CR However, the present case is because it is assumed the upper virtual arm UVA and the lower virtual arm LVA have the right-angled triangular cross-sections.

In a case that the upper virtual arm UVA does not have the right-angled triangular cross-section to be easily connected to the knuckle K, an extending line 26a represented as a dotted line in FIG. 3 is formed by connecting the internal joint 16 and the external joint 18 of the upper virtual arm UVA. The extending line 26a does not intersect with the virtual arm VL at the intersection point CP.

FIG. 4 is a schematic diagram for explaining the effects of a suspension system according to an exemplary embodiment of the present invention.

Referring to FIG. 4, the virtual link VL does not exist visually but the point (i.e., intersection point 'CP') at which the virtual link VL applies the constraint force to the knuckle K is formed at a virtual space by the virtual link module VLM. The intersection point CP is disposed more central to the internal to an actual connecting portion of the virtual link module VLM and the vehicle body in the width direction of the vehicle. Therefore, the length of the virtual link VL is set to be long.

In addition, the virtual joint 24 is positioned at the same height as the external joint 8 of the front lower control arm LCA and forms a virtual connecting point of the virtual link VL and the knuckle K. The internal joint 10 of the front lower control arm LCA is positioned on the same plane as the virtual link VL. Therefore, the virtual link VL can determine a direction of the constraint force to the knuckle K.

Therefore, the wheel W exhibits geometry characteristics tracing the motion trajectory according to a predetermined length and a predetermined direction of the virtual link VL acting as the virtual rear lower control arm.

Since a small virtual link module VLM is used instead of a conventional rear lower control arm according to the exemplary embodiment of the present invention, the virtual link module VLM can be disposed in a space having a dimension similar to that of the upper control arm UCA. In addition, the virtual link functions as the virtual rear lower control arm having a longer length than the upper control arm UCA. Therefore, the virtual link module can be disposed in a limited space and a suspension system having high driving performance can be achieved.

In addition, since the small virtual link module VLM substitutes for a conventional arm for the suspension system, a battery for a hybrid electric vehicle or a hydrogen tank for a hydrogen vehicle may be efficiently disposed in a remaining space.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension system for a vehicle comprising a knuckle rotatably supporting a wheel and a plurality of arms connecting the knuckle with a vehicle body,
   wherein an arm among the plurality of arms is a virtual link formed by a virtual link module and a point at which the virtual link applies a constraint force to the knuckle is formed at a virtual space, and
   wherein the virtual link module includes:
      an upper virtual arm including two arms extending from a virtual joint to form a triangle; and a lower virtual arm including two arms extending from the virtual joint to form a triangle different from the triangle formed by the upper virtual arm, and wherein end portions of the two arms of the upper virtual arm are respectively connected to the knuckle, and wherein end portions of the two arms of the lower virtual arm are respectively connected to the vehicle body.

2. The suspension system of claim 1, wherein the end portions of the two arms of the upper virtual arm are respectively formed of an internal joint and an external joint, and the end portions of the two arms of the lower virtual arm are respectively formed of an internal joint and an external joint.

3. The suspension system of claim 2, wherein horizontal rubber bushings are respectively used for the internal joint and the external joint of the upper virtual arm, and horizontal rubber bushings are respectively used for the internal joint and the external joint of the lower virtual arm.

4. The suspension system of claim 2, wherein the internal joint of the upper virtual arm is disposed lower than the external joint of the upper virtual arm, and the internal joint of the lower virtual arm is disposed higher than the external joint of the lower virtual arm.

5. The suspension system of claim 1, wherein a ball joint is used for the virtual joint to enable of relative rotation of the upper virtual arm and the lower virtual arm.

6. The suspension system of claim 1, wherein the point at which the virtual link applies the constraint force to the knuckle is an intersection point formed by intersecting an intersection line where an extending surface of the triangle formed by the upper virtual arm intersects with an extending surface of the triangle formed by the lower virtual arm with an extending line connecting the end portions of the two arms of the lower virtual arm.

7. The suspension system of claim 6, wherein the virtual link is formed by the intersection line between the intersection point and the virtual joint.

8. A suspension system for a vehicle including a knuckle rotatably supporting a wheel and a plurality of arms connecting the knuckle with a vehicle body, wherein an arm among the plurality of arms is a virtual link formed by a virtual link module, and the virtual link module includes an upper virtual arm and a lower virtual arm respectively having two arms extending from a virtual joint to cause a point at which the virtual link applies a constraint force to the knuckle to be formed at a virtual space.

9. The suspension system of claim 8, wherein the two arms of the upper virtual arm extend from the virtual joint to form a triangle, and end portions of the two arms of the upper virtual arm are respectively connected to the knuckle, and the two arms of the lower virtual arm extend from the virtual joint to form a triangle different from the triangle formed by the upper virtual arm, and end portions of the two arms of the lower virtual arm are respectively connected to the vehicle body.

10. The suspension system of claim 9, wherein the end portions of the two arms of the upper virtual arm are respectively formed of an internal joint and an external joint, and the end portions of the two arms of the lower virtual arm are respectively formed of an internal joint and an external joint.

11. The suspension system of claim 10, wherein each of horizontal rubber bushings is respectively used for the internal joint and the external joint of the upper virtual arm, and each of horizontal rubber bushings is respectively used for the internal joint and the external joint of the lower virtual arm.

12. The suspension system of claim 10, wherein the internal joint of the upper virtual arm is disposed lower than the external joint of the upper virtual arm, and the internal joint of the lower virtual arm is disposed higher than the external joint of the lower virtual arm.

13. The suspension system of claim 9, wherein a ball joint is used for the virtual joint to enable of relative rotation of the upper virtual arm and the lower virtual arm.

14. The suspension system of claim 9, wherein the point at which the virtual link applies the constraint force to the knuckle is an intersection point formed by intersecting an intersection line where an extending surface of the triangle formed by the upper virtual arm intersects with an extending surface of the triangle formed by the lower virtual arm with an extending line connecting the end portions of the two arms of the lower virtual arm.

15. The suspension system of claim 14, wherein the virtual link is formed by the intersection line between the intersection point and the virtual joint.

* * * * *